United States Patent [19]

Wickham et al.

[11] Patent Number: 4,697,318
[45] Date of Patent: Oct. 6, 1987

[54] ADAPTABLE MACHINING SYSTEM

[75] Inventors: John L. Wickham, Glenarm; Jeffrey D. Fox, Joppatowne; Ross C. Miller, Millers, all of Md.

[73] Assignee: The J. L. Wickham Company, Incorporated, Baltimore, Md.

[21] Appl. No.: 801,845

[22] Filed: Nov. 26, 1985

[51] Int. Cl.$^4$ ............................................. B23Q 37/00
[52] U.S. Cl. ....................................... 29/33 P; 29/563; 29/564
[58] Field of Search ............. 29/564, 563, 33 P, 26 A, 29/565, 50, 51, 33 R; 409/235, 158; 408/31, 34, 36, 37, 234

[56] References Cited

U.S. PATENT DOCUMENTS

| | | | |
|---|---|---|---|
| 4,218,815 | 8/1980 | Cumming | 29/563 |
| 4,343,073 | 8/1982 | Brems | 29/563 |
| 4,503,596 | 3/1985 | Ida et al. | 29/563 |

FOREIGN PATENT DOCUMENTS

| | | | |
|---|---|---|---|
| 647828 | 9/1962 | Canada | 29/33 P |
| 1279540 | 10/1968 | Fed. Rep. of Germany | 29/33 P |
| 2804584 | 8/1979 | Fed. Rep. of Germany | 29/33 P |
| 1171554 | 1/1959 | France | 29/33 P |
| 2772 | 1/1978 | Japan | 29/33 P |

OTHER PUBLICATIONS

"Hitachi Transfer Machine", pp. 1052-1056, Nov. 9, 1960, *Machinery*, vol. 97.

Primary Examiner—William R. Briggs
Attorney, Agent, or Firm—Cushman, Darby & Cushman

[57] ABSTRACT

An adaptable machining system includes a plurality of transport units mounted on a machine base with each transport unit carrying a system-standard mounting plate that receives a tool-carrying module. Each tool-carrying module includes a machining tool and associated motor mounted on a system-standard tooling plate which, with the mounting plate of the transport unit, define a system-standard tooling interface. The transport units, under the coordinated control of a system controller, advance their respective tooling modules to and from a work piece to accomplish their machining function. The mounting plate of each transport unit establishes an orthogonal reference system relative to the operating axes of the machine so that the position of each tool carried on a tooling module is known relative to the operating axes of the machine. Tooling change over from one set of tooling modules to another can be accomplished with a minimum of machine down time by removing the prior set of tooling modules and installing a replacement set. Since the system-standard tooling interface pre-establishes an orthogonal reference system for each tooling module, each tooling module can be bench fabricated and set-up to minimize tooling set-up time.

30 Claims, 17 Drawing Figures

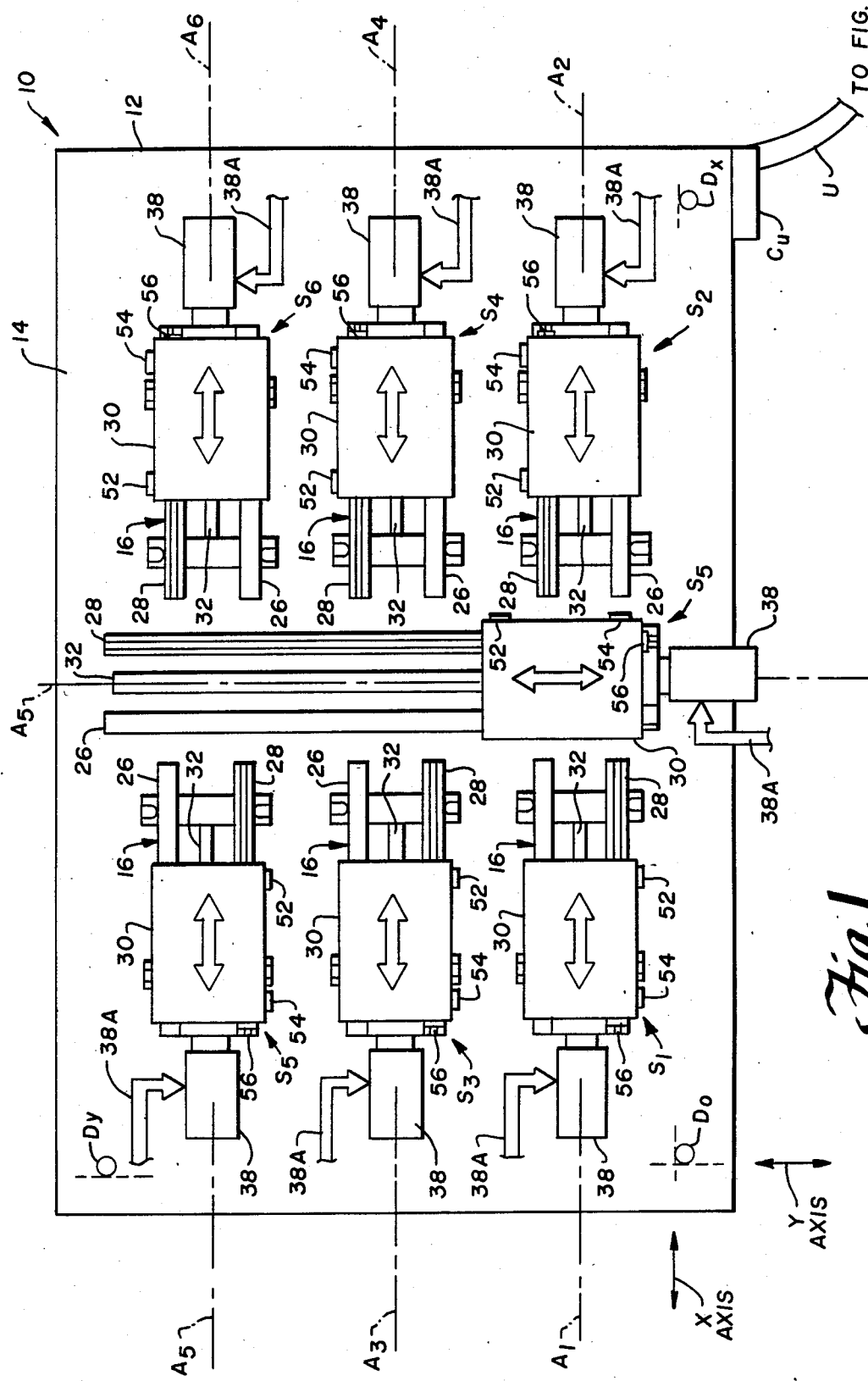

Fig. 2
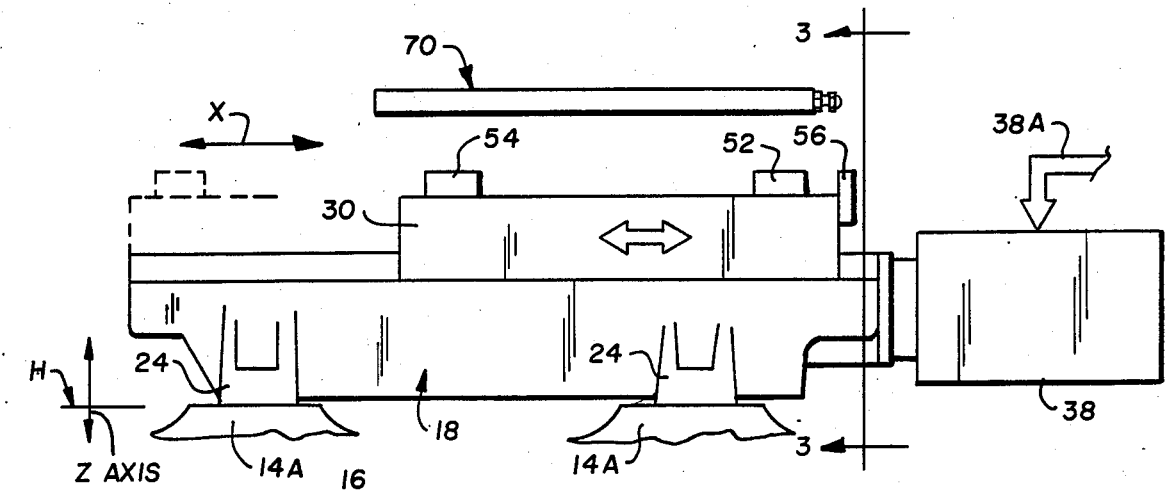
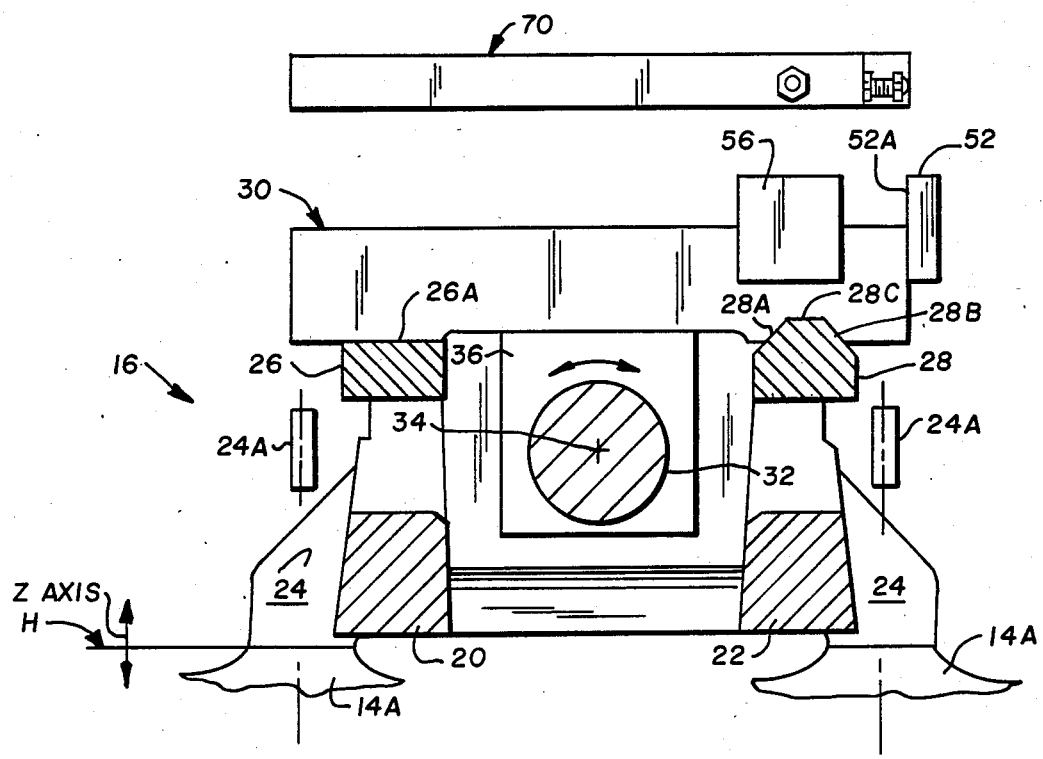
Fig. 3

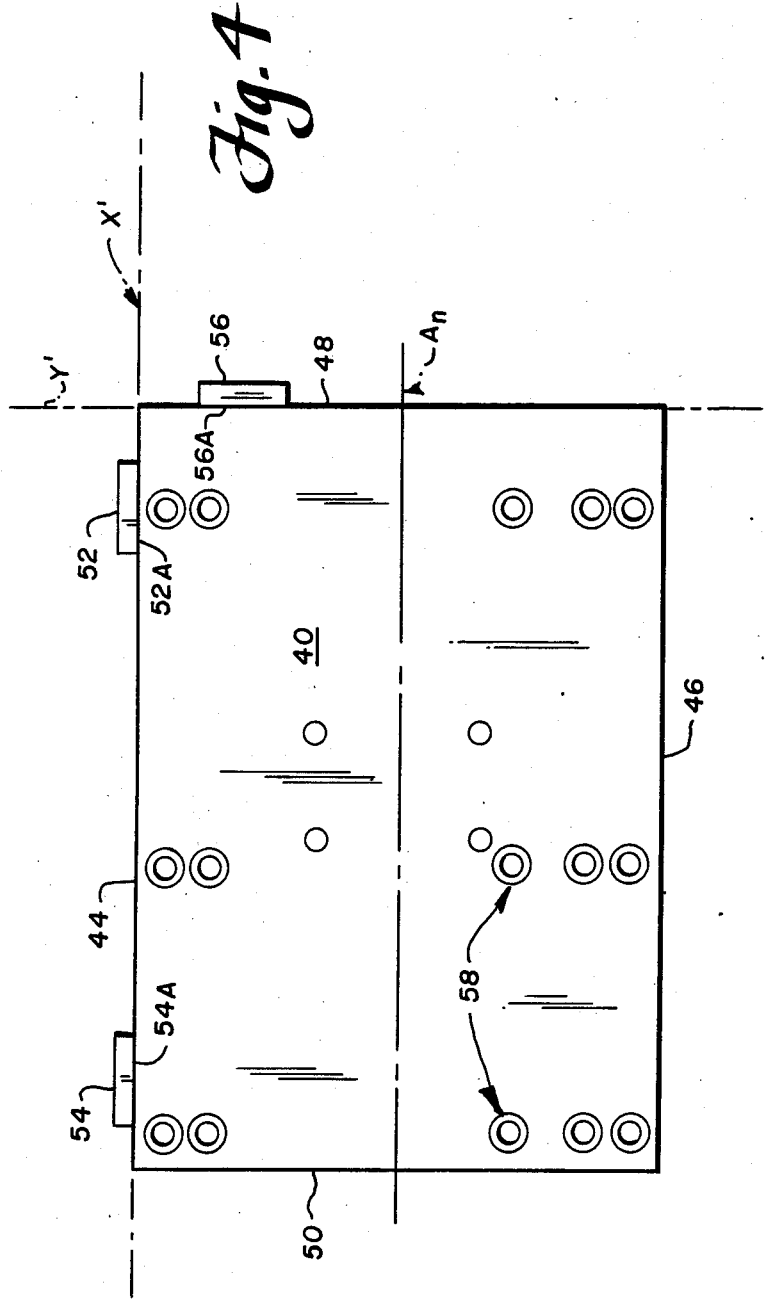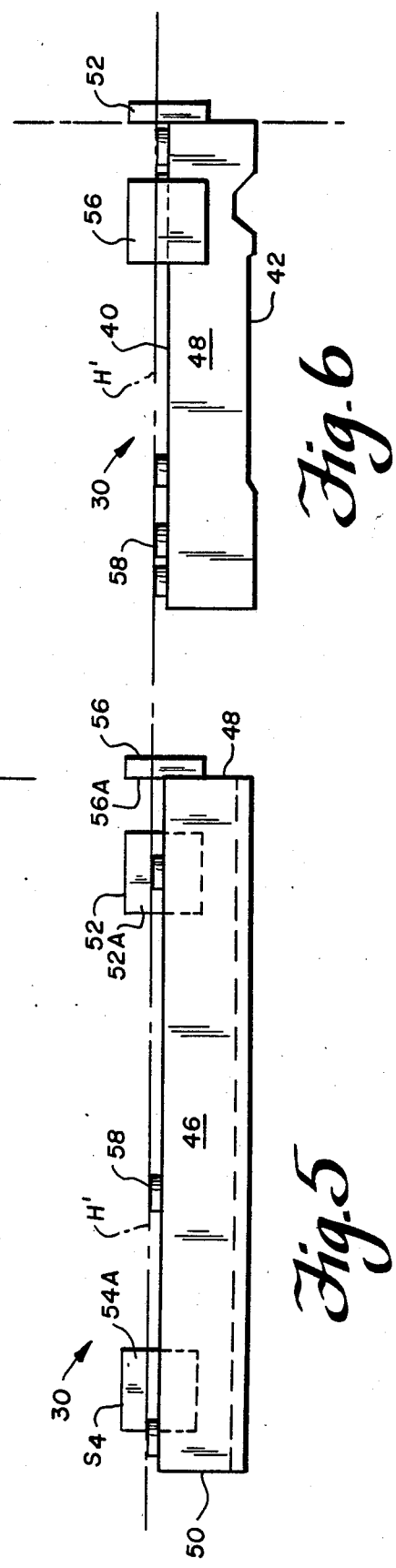

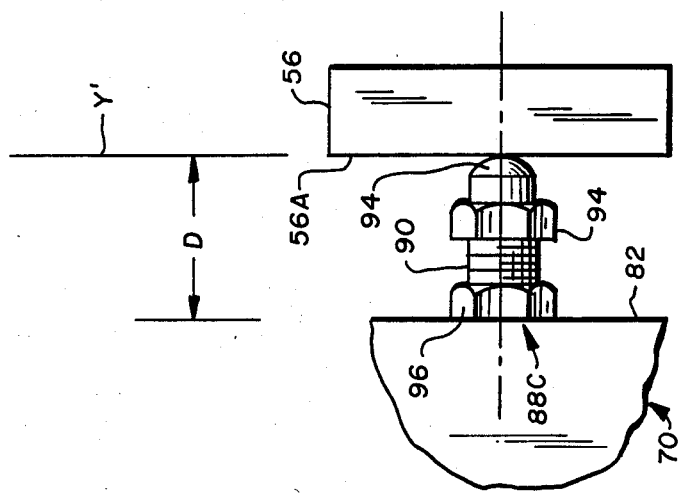
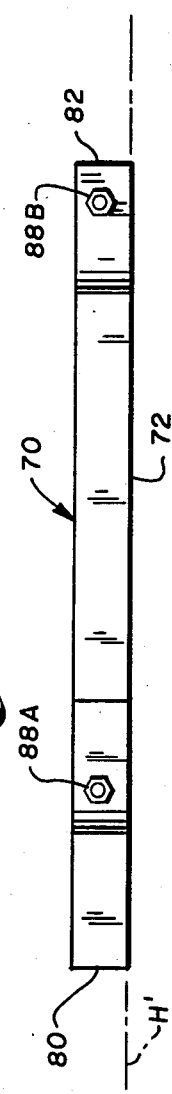
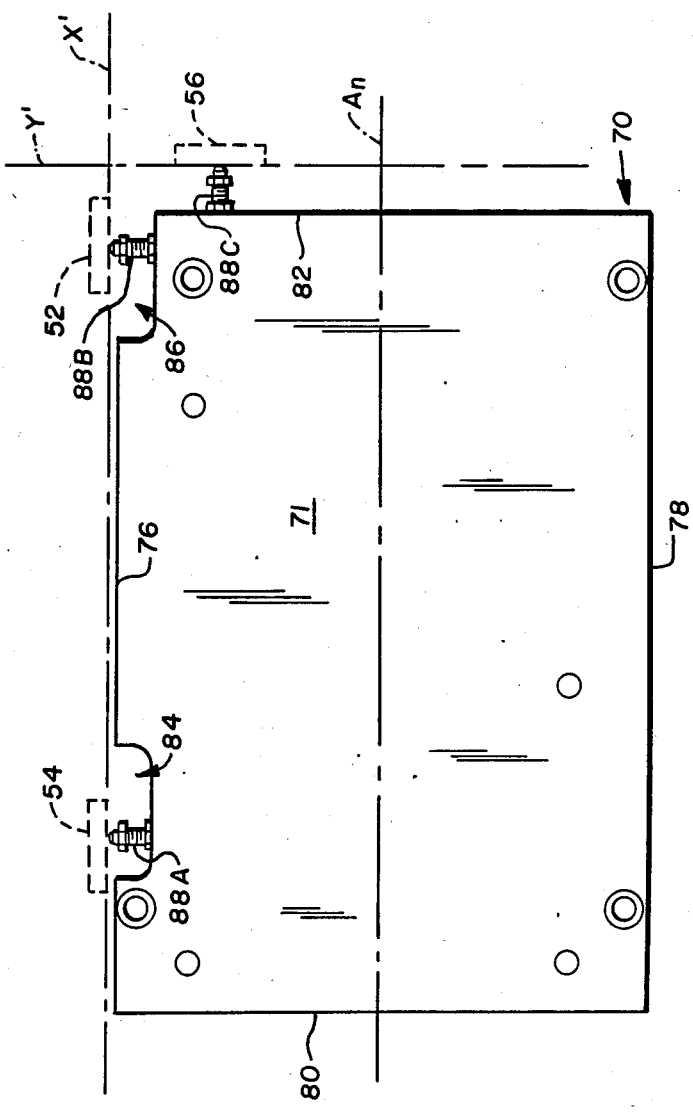

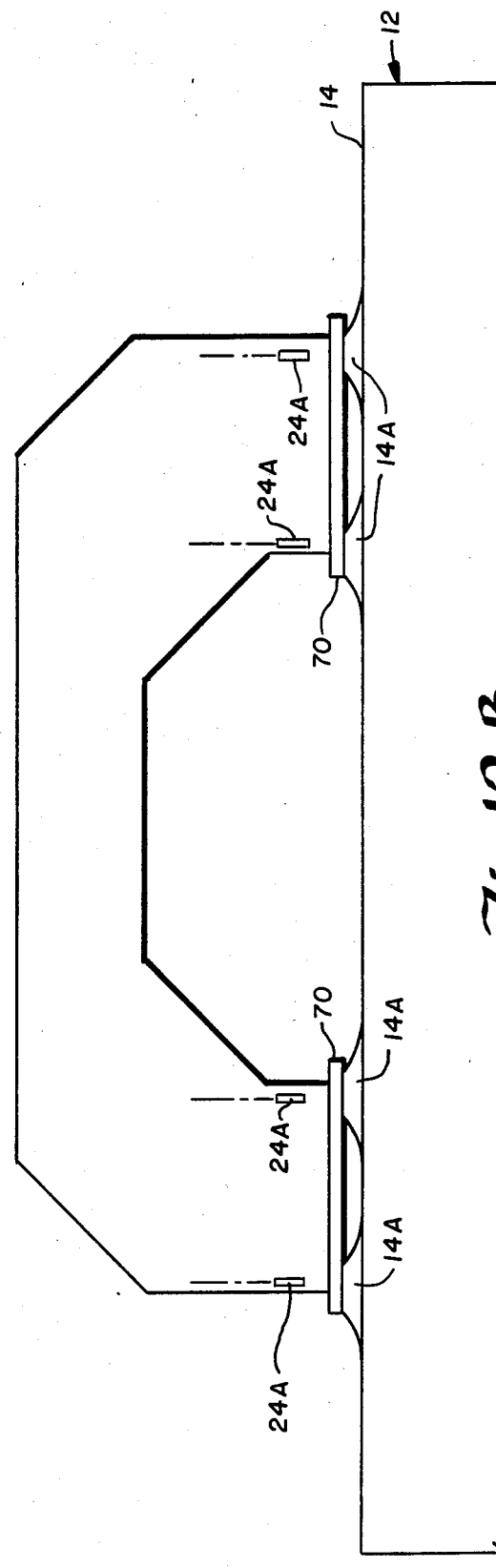

ADAPTABLE MACHINING SYSTEM

BACKGROUND OF THE INVENTION

The present invention relates to machining systems and, more particularly, to machining systems for the manufacture of machined parts in which a high degree of flexibility and adaptability is maintained while minimizing the time and costs associated with tooling changeover and set-up.

Systems for the manufacture of machined parts have historically been developed as a function of the volume of parts to be produced. Where a large quantity of parts are to be manufactured in a continuous or near continuous manner, as occurs in the automotive industry, specialized machinery is developed for the machining and shaping of a particular part. In general, the development and capital equipment costs for such specialized machine systems is very high although the initial costs can be amortized over the large volume of parts produced to result in lower overall piece-part costs when compared to other types of machining systems. While systems of this type are well-suited for large volume runs, their specialized design is such that they have a low adaptability for the manufacture of parts outside of their design specifications. Where machined parts are required in moderate volumes, as contrasted to high volumes, the design costs associated with dedicated or specially designed machine systems are prohibitive.

Various types of so-called flexible machining systems have been developed to meet the requirements for the moderate volume manufacture of machined parts. In these systems, one or two controllable tool-accepting spindles are made available for receiving various types of edged cutting or shaping bits. The spindles are controlled by a stored-program sequencer or computer that is programed to cause the tools to advance toward and retract from a workpiece, which may likewise be mounted for movement relative to the cutting or shaping tools. In the more sophisticated of these machines, the tools carried by the spindle or spindles are removed and replaced by automatic tool changers. While general purpose flexible machining systems can be adapted to manufacture different types of parts and do not require the substantial capital investment or specially designed systems, it is oftentimes difficult to produce a finished part of moderate complexity on a single stand-alone machine thus requiring additional machines and the transfer of semi-finished parts from one machine to the other. In addition, the operating cycle can be comparatively long for complex parts, oftentimes from six to eight times longer relative to the operating cycle provided by specially designed, high-volume machines. Also, flexible machining systems can require substantial changeover and set-up time to change tooling designed for the manufacture of a first part to tooling designed for the manufacture of another part. While flexible machine systems offer adaptability at reasonable capital costs, their relatively long operating cycles and tooling changeover and set-up times lower the ultimate productivity of the system to thus increase the piece-part machining costs.

SUMMARY OF THE INVENTION

In view of the above, it is an object of the present invention, among others, to provide a machining system that can produce complex parts with an operating cycle that is substantially less than that associated with flexible machining systems and yet provide a high degree of flexibility for the machining of parts in which the system can be quickly and efficiently changed over for manufacturing different types of parts.

It is another object of the present invention to provide an adaptable machining system in which tooling changeover and set-up time is minimal compared to prior systems to thus minimize down time and costs associated with tooling changeover.

It is another object of the present invention to provide an adaptable machining system that includes interchangeable tooling modules which can be mounted to and removed from a workstation position with minimal expenditure of time and in such a way that dimensional accuracy of the tooling is maintained.

It is a further object of the present invention to provide an adaptable machining system having interchangeable tooling modules in which the cutting or shaping edges of a tool are accurately established relative to reference surfaces of the tooling module.

It is still another object of the present invention to provide an adaptable machining system which uses system-standard tooling mounts having respective pre-established multi-coordinate reference systems so that tooling modules can be mounted in such a way that the dimensional relationship of the tooling to the workpiece is known to thus minimize tooling set-up time.

In accordance with these objects, and others, the present invention provides an adaptable machining system in which tooling modules are provided with each tooling module carrying the necessary tooling and a motor or other drive for operating tooling. The tooling and drive unit are mounted on a system-standard tooling plate that carries adjustable positioning devices. A base unit is provided with a plurality of workstation positions with each workstation position located relative to a pre-established multi-coordinate reference system. Each workstation position includes a transport unit having a system-standard mounting plate for accepting the tooling plate of any module. The transport unit is designed to move its mounting plate and tooling module from an initial, home position to and from a workpiece. By mounting all tooling on a common tooling plate to create tooling modules and by providing transport units having a mounting plate dimensionally located relative to the pre-established reference system and configured to accept any of the tooling modules, a system-standard mounting interface is created to provide substantial flexibility in configuring the machine system for the manufacture of a particular part. A change from one tooling module to another can be accomplished by dismounting the former tooling module from its transport unit and mounting a replacement tooling unit. Since the tooling modules have a common tooling plate and the transport modules have a common mounting plate which, in combination, define a system-standard mounting interface in which all dimensional relationships are pre-established, bench fabrication and set-up of each tooling module is possible to minimize machine system down time and costs traditionally associated with tooling changeover and set-up.

As can be appreciated, the standardized interfacing system between tool modules and the transport units, as well as the pre-establishment of a multi-coordinate reference system, allows the tool modules to be bench assembled and set-up prior to mounting on the machine base. The system thus advantageously reduces down time and set-up time to minimize costs associated with tooling changeover.

In addition to providing substantial flexibility and adaptability for the manufacture of different types of parts, the operating cycle for the manufacture of complex parts is typically four to six times shorter than for comparative flexible machining systems.

A principle objective of the present invention is, therefore, the provision of an improved adaptable machining system that possesses a high degree of flexibility to allow tooling changeover and set-up with a minimum of down time and which provides substantially shorter operating cycles compared to prior flexible machining systems. Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 1 is a plan view of an adaptable machining system in accordance with the present invention illustrating a machine base and plural workstations secured to the machine base;

FIG. 2 is a side view of a transport unit portion of a workstation mounted on the machine base and a tooling plate located above a slide plate of the transport unit, the slide plate and tooling plate defining a system-standard mounting interface;

FIG. 3 is a cross sectional view of the transport unit of FIG. 2 taken along line 2—2 of FIG. 2;

FIG. 4 is a top view of a slide plate component of the transport unit of FIGS. 2 and 3;

FIG. 5 is a side view of the slide plate of FIG. 4;

FIG. 6 is an end view of the slide plate of FIG. 4;

FIG. 9 is a plan view of a tooling plate;

FIG. 10 is a side view of the tooling plate illustrated in FIG. 9;

FIG. 11 is an enlarged detail view of an adjusting device for positionally locating the tooling plate relative to a slide plate;

FIG. 12B is a frontal view of the tooling gantry of FIG. 12A mounted directly to the machine base.

DESCRIPTION OF THE PREFERRED EMBODIMENT

Figure 1A:
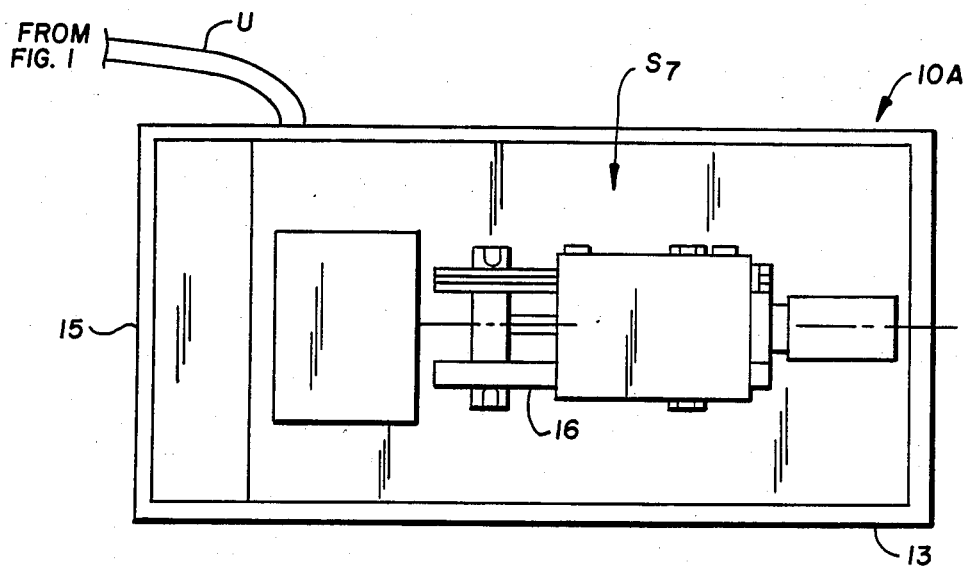
FIG. 1A is a top view of an auxiliary tooling unit that is connected to the machine base of FIG. 1 through an umbilical.

An adaptable machining system in accordance with the present invention is illustrated in plan view in FIG. 1 and designated therein generally by the reference character 10. The machine system 10 includes a base 12 having an upper generally horizontal surface 14 upon which a plurality of workstations $S_1, S_2, S_3, \ldots, S_n$ are mounted. While seven workstations have been illustrated in FIG. 1, a greater or lesser number of workstations $S_n$ may be employed. In the configuration of FIG. 1, one workstation is designated as a workpiece shuttle station $S_s$ while the remaining six workstations are located on opposite sides of the shuttle station $S_s$ with even numbered workstations $S_2, S_4,$ and $S_6$ located on the right side of the shuttle station $S_s$ and odd numbered work stations $S_1, S_2,$ and $S_3$ located on the left side of the shuttle station $S_s$. The shuttle station $S_s$ and each of the workstations $S_1, \ldots, S_6$ have respective operating axes $A_s$ and $A_1, \ldots, A_6$ with the axes $A_1$-$A_2$, $A_3$-$A_4$, and $A_5$-$A_6$ defining respective axes pairs that are parallel to one another and perpendicular to the shuttle axis $A_s$. In the illustrated embodiment, the workpiece shuttle station $S_s$ carries a suitably fixtured workpiece (not shown) along its axis $A_s$ while the machining tools of workstations $S_1 \ldots S_6$ are advanced along their respective operating axes $A_1 \ldots A_6$ toward the shuttle axis $A_s$ to machine or otherwise shape the workpiece.

The machine base 12 is provided with locating surfaces that define a perpendicular set of reference axes from which all other operating axes $A_n$ are determined. The perpendicular axis system can be established, for example and as shown in FIG. 1, by providing at least three upstanding pins or locating dowels $D_o$, $D_x$, and $D_y$ in the surface 14 of the machine base 12 with the dowel $D_o$ functioning as an origin for an X-Y axis system. The dowels $D_o$ and $D_x$ define an axis X from which the operating axes $A_{1-6}$ are located, and the dowels $D_o$ and $D_y$ define an axis Y from which the operating axis $A_s$ is located.

Figure 1B:
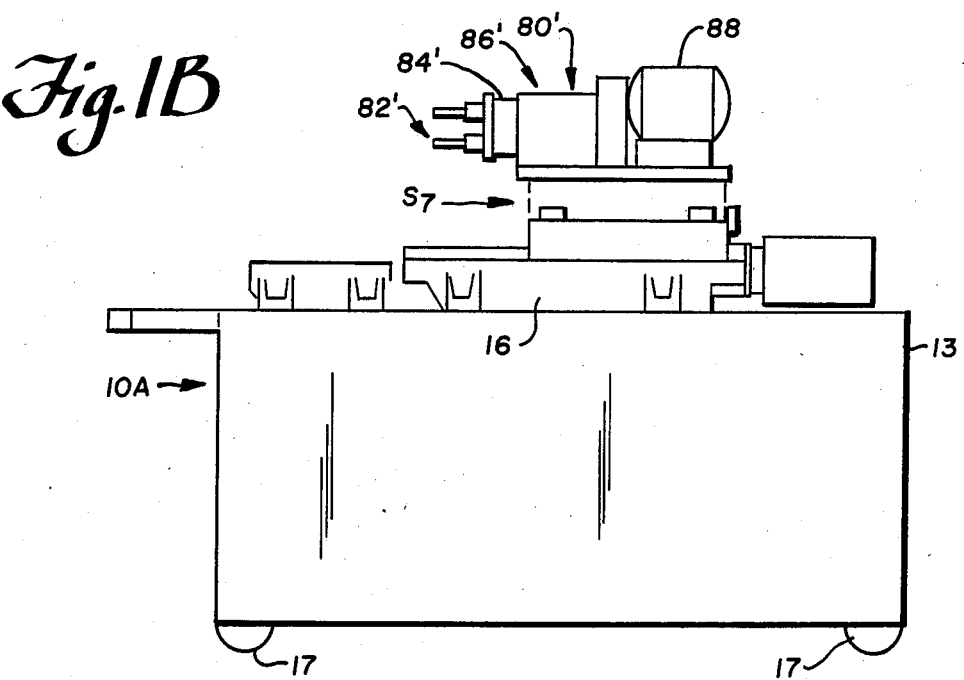
FIG. 1B is a side view of the auxiliary tooling unit of FIG. 1A and, additionally, an examplary tool module positioned, for the purpose of illustration, above the auxiliary tooling unit.

In addition to the machine base 12, the machining system 10 includes, as shown in FIGS. 1A and 1B, an auxiliary tool unit 10A that carries any type of tooling to augment the functions provided by the workstations $S_n$ on the machine base 12. The auxiliary functions can include subjecting a workpiece to preliminary machining, shaping, or treating steps prior to presenting a workpiece to the various workstations $S_n$ on the machine base 12 or post machining, cleaning, treating, or inspection steps. While a wide variety of auxiliary tooling is possible, the auxiliary tooling unit 10A or FIGS. 1A and 1B has been shown with a workstation, designated generally as $S_7$ and described in greater detail below, that is similar to the workstations $S_n$ of the machine base 12. The auxiliary tooling unit 10A is defined as a cart 13 having a handle 15 and wheels 17, some of which may be swivelled to facilitate positioning of the cart 13. The auxiliary tooling unit 10A is connected to the machine base 12 through an umbilical U and a connection interface $C_U$ which provide all control and operating power to the auxiliary tooling unit 10A. For example, the umbilical U and its connection interface $C_U$ can provide electrical power, electronic or electrical control signals, lubrication and cutting fluid(s), pressurized air, and hydraulic fluid. The connection interface $C_U$ includes those electrical and non-electrical connectors and couplings required to effect the necessary connections with the various auxiliary tooling units 10A. In the context of the present invention, the machine base 12 functions as a host which provides electric and fluidic power to the dependent auxiliary tooling unit 10A. The auxiliary tooling unit 10A provides increased flexibility for the machine system 10 in that a number of auxiliary tooling units 10A are fabricated to perform specific functions and quickly connected to and disconnected from the machine base 12 on an as-required basis.

Each workstation $S_n$ includes a transport unit, designated generally in FIGS. 1A, 1B, 2, and 3 by the reference character 16. Each transport unit 16 includes a base 18 defined by support walls 20 and 22 with mounting lugs 24 provided for bolting or otherwise securing the transport unit 16 to the upper surface 14 of the machine base 12. As shown in FIGS. 2 and 3, the machining base 10 is provided with raised mounting pads 14A upon which the mounting lugs 24 are positioned. The upwardly facing surfaces (unnumbered) of the mounting pads 14A are machined or otherwise formed in a common plane H and at a selected elevation relative to a Z axis that is orthogonal to the X and Y axes discussed above. Various techniques can be used to locate and align, i.e., qualify, the transport units 16 relative to the reference axes X and Y. For example, the transport units 16 can be placed upon their respective mounting pads 14A and positionally shifted relative to the X and Y axes with a dial indicator arrangement or other type of gauge placed against predefined locating surfaces, described more fully below, to indicate the desired position of each transport unit 16. Thereafter, threaded fasteners (not shown) are used to secure each located and aligned transport unit 16 in place. In addition, the transport units 16 can be located on their respective mounting pads 14A by locating dowels 24A (FIG. 3) which pass through registered bores (not shown) formed in both the mounting lugs 24 and the mounting pads 14A. The position of the various locating dowels 24A is determined from the dowels $D_o$, $D_x$, and $D_y$ that define the axes X and Y. The base 18 of each transport unit 16 is provided with guideways 26 and 28 at the upper ends of the support walls 20 and 22 with the guideway 26 having a generally flat upper surface 26A and the guideway 28 having oppositely inclined upper surfaces 28A and 28B and a generally flat top surface 28C. A slide plate 30, described in greater detail below in relationship to FIGS. 4-6, is mounted upon the guideways 26 and 28 for controlled movement along the guideways from a retracted or 'home' position, as represented in solid line illustration in FIG. 2, to an extended position, as represented in partial broken line illustration in FIG. 2. The movement and positioning of the slide plate 30 along the guideways 26 and 30 is effected through a threaded lead screw 32 that is mounted between the support walls 22 and 24 of the base 18 and carried in suitable bearings (not shown) for rotation about a lead screw axis 34 (FIG. 3). A ball-nut assembly 36 is secured to the underside of the slide plate 30 and engages the lead screw 32 in the usual manner. Rotation of the lead screw 32 about its mounting axis 34 in one direction or the other will cause a corresponding linear movement of the connected slide plate 30 along the guideways 26 and 28 as indicated generally by the directional arrows in FIGS. 2 and 3. The lead screw 32 is coupled to a bidirectional servo unit 38 which includes a drive motor for rotating the lead screw 32 in one direction or the other and a sensor for sensing each incremental rotation of the lead screw 32 by the drive motor. Suitable servo units 38 include the model JR-16M4CH DC servo manufactured by the PMI Corporation and the model 5K38UN2700 AC servo manufactured by the General Electric Corporation. As explained more fully below in relationship F45Ato FIG. 13, each servo unit 38 is coupled through appropriate cabling 38A to a system controller that precisely controls the coordinated movement of each slide plate 30, including the absolute positioning of a slide plate 30 along its workstation axis $A_n$ relative to its 'home' position, its position relative to the workpiece shuttle axis $A_s$, and its rate of movement along its supporting guideways 26 and 28.

As shown in FIGS. 4, 5, and 6, each slide plate 30 is defined as a generally rectangular block having upper and lower surfaces 40 and 42, sidewalls 44 and 46, and end walls 48 and 50 with the various side and end walls being perpendicular to one another. As shown in FIG. 6, the lower surface 42 of the slide plate 30 is configured to mount upon the guideways 26 and 28. Locating plates 52 and 54 are secured to the sidewall 44 and present locating surfaces 52A and 54A which define a reference plane X' that is spaced from and in parallel relationship with the workstation axis $A_n$, which, in turn, is parallel to the X axis defined between the locating dowels $D_o$ and $D_x$ (FIG. 1). Another locating plate 56 is mounted on the end wall 48 and presents a locating surface 56A which intersects the reference plane X' along a line Y' that is parallel to the Y axis defined between the locating dowels $D_o$ and $D_y$. The locating surfaces 52A, 54A, and 56A are used in combination with a dial indicator or other type of gauge, as described above, to initially locate and align each transport unit 16 relative to the X and Y axes. The slide plate 30 is provided with a number of bores and counterbores (not specifically numbered) in its upper surface 40 for use in securing the slide plate 30 to the ball-nut assembly 36 and for securing interchangeable tooling modules, as explained more fully below, to the slide plate 30.

Figure 7:
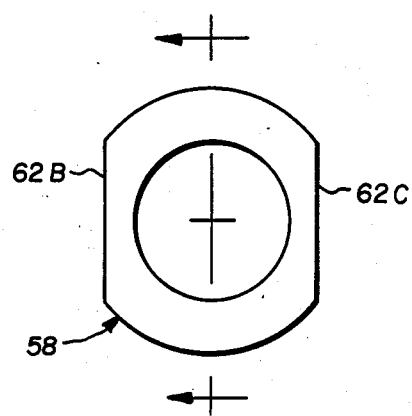
FIG. 7 is a top view of a mounting pad used with the slide plate of FIGS. 5-7.
Figure 8:
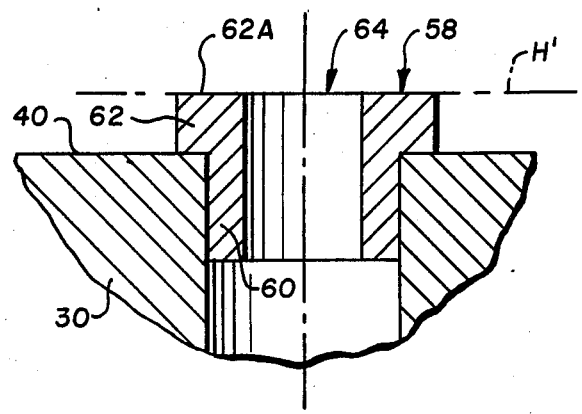
FIG. 8 is a cross sectional view of the mounting pad of FIG. 7 taken along line 8—8 of FIG. 7.

Mounting pads 58 are provided on the upper surface 40 of the slide plate 30 and function to support tooling modules, as explained below, as well as define a chip clearance space between the upper surface 40 of the slide plate 30 and any supported tooling module. As shown in FIGS. 7 and 8, each mounting pad 58 includes a cylindrical extension 60, a radially extending flange 62 at one end that presents an upwardly facing mounting surface 62A, and a bore 64 formed through the flange 62 and the extension 60. If desired, parallel flat surfaces 62B and 62C may be provided on the flange 62 to assist in gripping the flange 62 with a wrench or similar too. As shown in FIG. 8, the mounting pads 58 are secured to the slide plate 30 by forming appropriately sized bores (unnumbered) in the slide plate 30 and inserting each mounting pad 58 into its respective bore. A clearance, line-to-line, or interference fit, with or without an adhesive, may be used to fit the mounting pads 58 in their respective bores. The mounting pads 58 need not have the specific configuration shown in FIGS. 7 and 8 and can be formed, for example, with square or rectangular flanges, or, if desired, as elongated strips. In general, is preferred that the mounting pads 58 be formed from hardened steel to minimize wear from normal use, misuse, and the presence of any abrasives or other contaminates. As indicated above, the upwardly facing surfaces 62A of the mounting pads 58 are preferably located a small distance (e.g., 0.125″) above the upwardly facing surface 40 of the slide plate 30 to provide a clearance space for the accumulation of chips and other debris.

The upwardly facing mounting surfaces 62A of the mounting pads 58 define a generally horizontal plane H' (FIG. 5) that is parallel to the plane H defined by the upwardly facing surfaces of the mounting pads 14A (FIGS. 2 and 3) and which is located a selected distance along the Z axis above the plane H. The intersecting axes X' and Y' defined by the locating surfaces 52A, 54A, and 56A and the plane H' defined by the upwardly facing mounting surfaces 62A of the mounting pads 58 define an orthogonal 3-2-1 datum or reference system for each workstation $S_n$ in which the dimensional relationship between the axes X and X', the axes Y and Y', and the planes H and H' is known relative to the respective workstation $S_n$ operating axis $A_n$, the operating axes $A_n$ of the other workstations $S_n$, and the operating axis $A_s$ of the shuttle workstation $S_s$. Since each servo unit 38 precisely controls the position of its respective slide plate 30 along the respective operating axis, that is, along the X or X' axis in the case of the workstations $S_{1-6}$ and the Y or Y' axis in the case of the shuttle workstation $S_s$, the exact position, typically within 0.001", of any slide plate 30 is known in absolute terms relative to the X and Y axes and the plane H.

A tooling plate 70, shown above the slide plate 30 in FIGS. 2 and 3 and in detail in FIGS. 9–11, is designed to mount upon each slide plate 30 and define an standard-dimension mounting interface with the slide plate 30. The tooling plate 70 is generally rectangular and includes upper and lower surfaces 71 and 72, sidewalls 76 and 78, and end walls 80 and 82. The side wall 76 is preferably provided with cut-out portions 84 and 86 with adjustable positioning devices 88A and 88B mounted to the tooling plate 70 in the cut-out portions 84 and 86, respectively, and another adjustable positioning device 88C mounted on the end wall 82. As shown in the detail of FIG. 11, each positioning device 88 includes a threaded shaft 90 that engages a complementary threaded bore (not shown) formed in the tooling plate 70 with an adjusting nut 92 and a crowned head 92 formed at one end. A lock nut 96 in carried on the threaded shaft 90 and used to lock the threaded shaft 90 from adjustment. Other locking arrangements, including plastic-tipped set screws which engage the threads of the shaft 90, can be used to lock the threaded shaft 90 from unintended movement. As can be appreciated, the distance D between the end wall 82 and the crowned end 92 of the threaded shaft 90 can be established by appropriate rotation of the threaded shaft 90 and locking the shaft 90 against rotation by use of the lock nut 96. The positioning devices 88A, 88B, and 88C, when the tooling plate 70 is mounted on a slide plate 30, engage the respective locating surfaces provided by the locating plates 52, 54, and 56, as illustrated in dotted line in FIG. 9. As can be appreciated, the positioning of the tooling plate 70 relative to the reference plane H' defined by the upper surfaces 62A of the mounting pads 58, the axis X' defined by the locating surfaces 52A and 54A of the locating plates 52 and 56, and the axis Y' defined by the locating surface 56A of the locating plate 56 can be precisely controlled. Since, as described above, the slide plates 30 are formed in a uniform manner to define orthogonal reference planes having a known dimensional relationship with the respective machine station axis $A_n$, a tooling plate 70 can be moved from one slide plate 30 to another and nonetheless maintain a precise and repeatable dimensional relationship between the tooling plate 70 and the associated operating axis $A_n$ and the workpiece shuttle axis $A_s$.

In addition to the use of flat locating plates 52, 54, and 56 and threaded adjusting devices 88A, 88B, and 88C, other devices can be used to define and control the location of the tooling plate 70 relative to their slide plates 30. For example, cylindrical pins or dowels can be provided on the slide plates and positional adjustment effected through eccentrically mounted cams or adjustable wedges. The tooling plates 70 can be secured to their respective slide plates 30 using threaded fasteners (not shown) extending through and into bores formed in the two components. In addition, other attaching devices may be used, including various type of pneumatic and hydraulic clamps and hold-downs.

Figure 12:
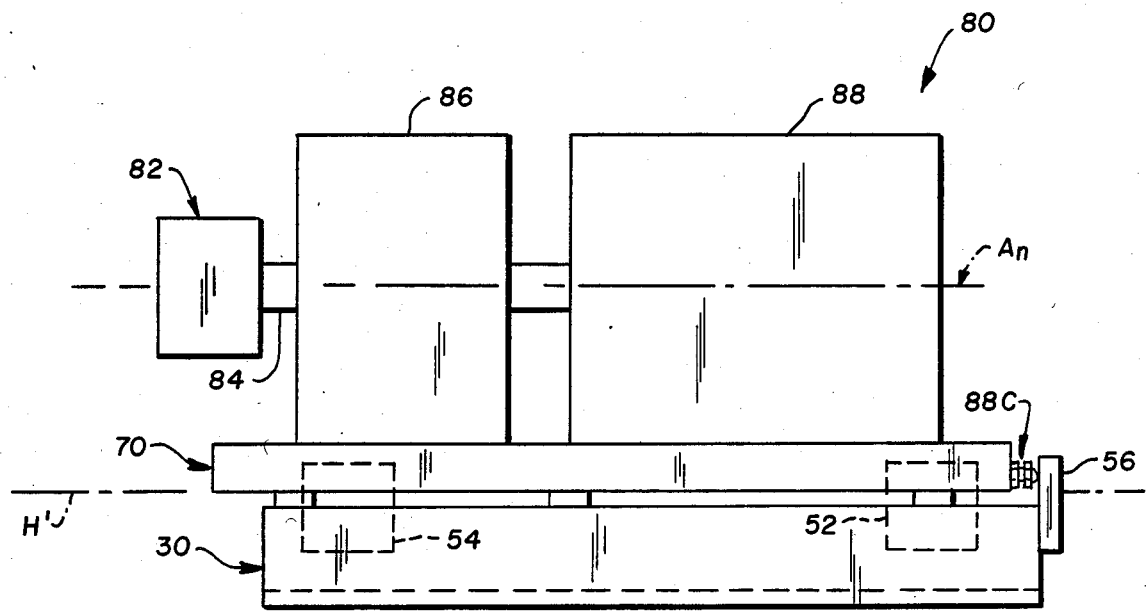
FIG. 12 is a side elevational view, is schematic form, of a tooling module mounted upon a slide plate.

Various types of machining and shaping tools can be mounted on each tooling plate 70 to define a tooling module. By way of example and a shown in schematic fashion in FIG. 12, a tooling module 80 includes a tool bit 82, such as an end mill, a spindle 84 upon which the tool bit 82 is mounted, a transmission unit 86, and a drive motor 88. While not specifically shown, connectors and wiring are provided for each tooling module 80 to control and power the drive motor 88. In addition, conduits are provided for lubrication, cutting, and hydraulic fluid as well a pressurized air. The tooling module 80 of FIG. 12 is designed to effect milling of a flat surface of a workpiece mounted on the shuttle workstation $S_s$. In FIG. 1B, another exemplary tooling module 80' is illustrated and includes twin boring bars 82', a spindle unit 84', a transmission 86', and a drive motor 88'.

Figure 12A:
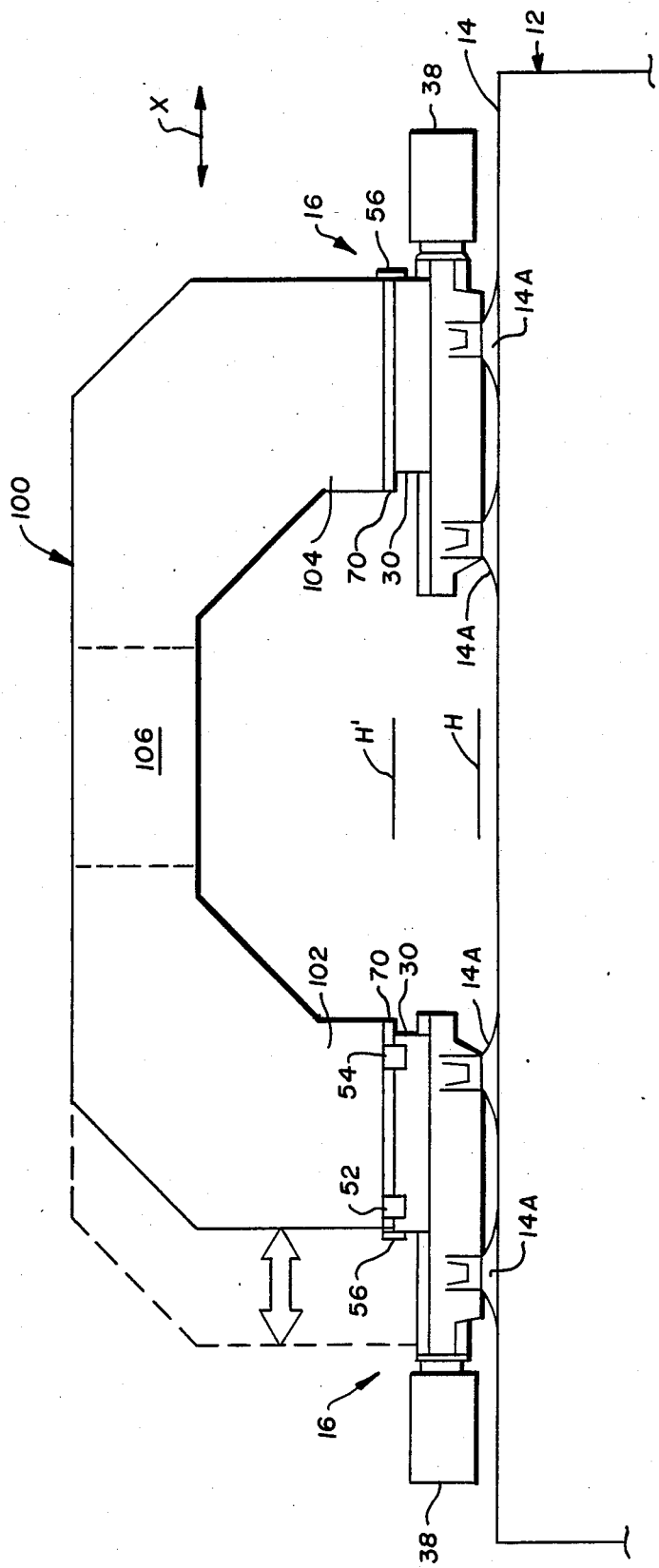
FIG. 12A is a frontal view of a tooling gantry mounted on a pair of transport units.

In addition to tooling modules that are mounted on a single transport unit 16, such as the modules 80 and 80', tooling can be distributed, as shown in FIG. 12A, between two transport units 16. As shown, a tooling gantry 100, formed as an inverted U-shaped structure, includes downwardly extending legs 102 and 104 that are secured to respective tooling plate 70 and mounted on the slide plates 30 of two opposed workstations that span the workpiece shuttle axis $A_s$, for example, workstations $S_3$ and $S_4$. The tooling plates 70 include the adjustable positioning devices 88 discussed above to positionally locate the gantry 100 relative to the axes X and Y as well as the plane H. The servo units 38 of each workstation are initially positioned so that one slide plate 30, as shown on the right in FIG. 12A, is in its 'home' position while the other slide plate 30, as shown on the left in FIG. 12A, is in its advanced position. Accordingly, the entire gantry 100 can be moved from the solid line position of FIG. 12A to the dotted line position by synchronous control of the servo units 38. Machining or shaping tools are secured to gantry 100 surface, for example, in the area 106, and machine or otherwise shape the workpiece as it either passes under or is positioned under gantry 100. While a gantry 100 mounted on transfer units 16 on opposite sides of the shuttle axis $A_s$ allows machining of the upper surface of a workpiece while feeding gantry 100 and its tool bit or bits in the X axis direction, it is also possible to directly mount the gantry 100 to the machine base 10. As shown in FIG. 12B, the tooling plates 70 are placed upon the mounting pads 14A and locating dowels 24A, as described above, are passed through registered bores (not shown) in both the tooling plates 70 and the mounting pads 14A to positionally locate the gantry 100 relative to the X and Y axes. In addition to the use of dowels 24A, locating plates (not shown) similar to the locating plates 52A, 54A, and 56A can be mounted to the machine base 12 and used to locate and align the gantry 100 relative to the X and Y axes. As can be appreciated, a large variety of tools and drives can be used to fabricate tooling modules 80. For example, tooling modules can be fabricated with drilling heads, single and multiple boring tools, side and end mills, and various types of single and ganged cutters.

Since the dimensional relationship of the orthogonal reference axes and reference plane established by the slide plate 30 of each transport unit 16 is known relative to the workstation axis $A_n$ and the shuttle station axis $A_s$, a tooling module 80 can be bench fabricated and set-up without the need to mount the tooling module 80 on its slide plate 30. As a consequence of this feature, a machining system can be in production for the manufacture of a first part while the tooling modules for a second part are bench fabricated and set-up. Changeover from one set of tooling modules to another can be rapidly accomplished since only the first set of tooling modules need be removed and the second set installed. By way of comparison, a set of six tooling modules can be changed over in as little as one or two hours compared to changeovers that may take days or weeks in prior systems.

Figure 13:
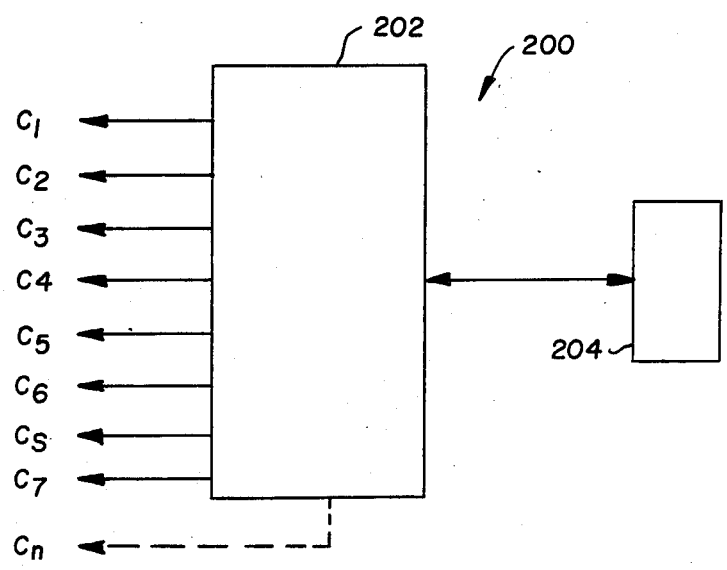
FIG. 13 is a schematic block diagram of a system controller for controlling the machining system of FIG. 1.

The servo unit 38 of each workstation $S_n$ is connected by respective cables 38A to a system controller 200 shown in schematic fashion in FIG. 13. As shown, the system controller 200 includes a control unit 202 that is programmed through a user interface 204 and connected to the servo unit 38 of each workstation $S_1 \ldots S_6$ and to the servo unit 38 of the shuttle station $S_s$ through respective cables $C_1 \ldots C_6$ and $C_s$ with an additional cable $C_n$ provided for the auxiliary tooling unit 10A. The control unit 202 is programmed to provide instructions to each servo unit 38 to advance its tooling module 80 at selected feed rates from its initial 'home' position to one or more pre-defined positions and to return the tooling module to its 'home' position. A suitable controller is the model 6000 programmable controller manufactured by the General Electric Company. By way of example, the controller 202 can be operated to rapidly advance a suitably fixtured workpiece (not shown) carried by the workpiece shuttle station $S_s$ from its initial position to a position at the intersection of the shuttle axis $A_s$ and the workstation axes $A_1$ and $A_2$ where the workpiece is halted while the workstations $S_1$ and $S_2$ are operated to advance to the workpiece and perform their machining operation, e.g., drilling or boring. Thereafter, the workstations $S_1$ and $S_2$ are controlled to retract to their initial positions and the workpiece is again advanced along the shuttle axis $A_s$ through the intersection of the shuttle axis $A_s$ and the workstation axes $S_3$ and $S_4$ while the workstations $S_3$ and $S_4$ are controlled to advance their tooling to the workpiece and perform their machining operation, e.g., surface milling. In a similar manner, the workpiece is then again advanced along the shuttle axis $A_s$ to the intersection of the workstation axes $S_5$ and $S_6$ to again undergo a machining step. Upon completion of the machining operations, the workpiece is then returned to its initial position to complete the machining cycle for the workstations $S_{1-6}$. Depending upon the auxiliary tool unit 10A provided (FIGS. 1A and 1B), the workpiece can be subjected to additional machining, shaping, or treatment steps. As can be appreciated, a large number of machining cycles and sub-cycles are possible.

An adaptable machining system which utilizes tooling modules having a uniform system-standard mounting interface permits maximization of machine system productivity by minimizing downtime associated with tooling changeover and set-up. For example, a machine system can operate with a first set of tooling modules designed for the production of a first part while a second set of tooling modules is designed and fabricated for the manufacture of a second part. Since the relationship of the reference axes X and X', Y and Y', and the planes H and H' to the operating axis of each workstation $S_n$, including the shuttle workstation $S_s$, is known, the second set of tooling modules can be bench set-up. When a tooling changeover is to be effected, the first set of tooling modules is removed from their transport units by removal of appropriate fasteners and hold-downs and disconnection of electrical, lubrication, pneumatic, hydraulic lines, as necessary. The second set of tooling modules is then mounted on their respective slide plates with the tooling plates, including their bench-adjusted positioning devices, cooperating with the locating plates to precisely locate each tooling module relative to the respective reference axes X' and Y' and the plane H'. After securing the tooling modules in place and connecting the respective electrical, pneumatic, hydraulic, and lubrication lines and connection of the appropriate auxiliary tooling unit(s) 10A, as required, the machining system 10 may be operated to produce machined parts. As can be appreciated, machine system downtime is held to a minimum to maximize overall productivity.

Thus it will be appreciated from the above that as a result of the present invention, a highly effective adaptable machining system is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. An adaptable machining system comprising:
a machine base having a plurality of defined workstation positions to which respective workstations may be secured and means defining a multi-axis reference system; and
a workstation secured to each of said workstation positions, each of said workstations including a transport unit having a stationary member secured to a workstation position and a module-receiving member mounted for movement relative to said stationary member to and from a workpiece machining position, said module-receiving member of each transport unit establishing a multi-axis coordinate system relative to the multi-axis reference system of said machine base; a tool module for mounting upon respective module-receiving members of each transport unit and including a tool and means for driving said tool, each of said tool modules having an interface member for cooperatively engaging its respective module-receiving member to dimensionally define the position of said tool module relative to the multi-axis coordinate system of the respective module-receiving member and the multi-axis reference system of said machine base,
wherein said module-receiving members further comprise surface means for defining respective first, second, and third coordinate defining surfaces for the respective interface member, and
wherein said interface members further comprise first, second, and third surfaces for engaging said first, second, and third coordinate defining surfaces of said module-receiving member.

2. The adaptable machining system of claim 1, wherein said transfer units further comprise:
a slide member mounted for sliding movement relative to a stationary member secured to said machine base, said slide member including said surface means that define respective first, second, and third coordinate defining surfaces for the respective interface member.

3. The adaptable machining system of claim 2, wherein said interface members comprise:
a tool mounting plate having first and second adjustable positioning means for engaging said first and second coordinate defining surfaces of said slide member and having a surface for engaging said third coordinate defining surface of said slide member.

4. The adjustable machining system of claim 3, wherein said adjustable positioning means each comprise a threaded member positioned between said tool mounting plate and said slide member and adjustable to control the distance between said tool mounting plate and said first and second coordinate defining surfaces.

5. The adaptable machining system of claim 4, wherein each threaded member is in threaded engagement with said tool mounting plate and maintained in surface contact with their respective coordinate defining surface.

6. The adaptable machining system of claim 5, wherein said third locating surfaces is defined by a plurality of discrete mounting pads in said slide member.

7. The adaptable machining system of claim 6, wherein said discrete mounting pads define said third coordinate defining surface above the surface of said slide member to define a clearance space therebetween.

8. An adaptable maching system comprising:
a machine base having a plurality of defined workstation positions to which respective workstations may be secured and means defining a multi-axis reference system; and
at least one workstation secured to one of said workstation positions, said workstation including a transport unit having a stationary member secured to the workstation position and a module-receiving member mounted for movement relative to said stationary member to and from a workpiece machining position, said module-receiving member establishing a multi-axis coordinate system relative to the multi-axis reference system of said machine base; a tool module for mounting upon said module-receiving member of said transport unit and including a tool and means for driving said tool, said tool module having an interface member for cooperatively engaging said module-receiving member to dimensionally define the position of said tool module relative to the multi-axis coordinate system of the module-receiving member and the multi-axis reference system of said machine base, wherein said module-receiving member further comprises surface means for defining respective first, second, and third coordinate defining surfaces for said interface member, and
wherein said interface members further comprise first, second, and third surfaces for engaging said first, second, and third coordinate defining surfaces of said module-receiving member.

9. The adaptable machining system of claim 8, wherein said transfer unit further comprises:
a slide member mounted for sliding movement relative to a stationary member secured to said machine base, said slide member including said surface means for defining first, second, and third coordinate defining surfaces for said interface member.

10. The adaptable machining system of claim 9, wherein said surface means defining said third coordinate defining surface comprises a plurality of discrete mounting pads.

11. The adaptable machining system of claim 9, wherein said interface member comprises:
a tool mounting plate having first and second adjustable positioning means for engaging said first and second coordinate defining surfaces of said slide member and having a surface for engaging said third coordinate defining surface of said slide member.

12. The adjustable machining system of claim 11, wherein said adjustable positioning means each comprise a threaded member positioned between said tool mounting plate and said slide member and adjustable to control the distance between said tool mounting plate and said first and second coordinate defining surfaces.

13. An adaptable machining system comprising:
a machine base having means for defining a dimensional reference system including mutually perpendicular X and Y axes and a plane H at a selected position relative to a Z axis that is normal to said X and Y axes, said machine base including a plurality of workstation position having a defined position relative to said X and Y axes and said plane H;
at least one workstation secured to one of said workstation positions, said workstation including a transport unit having a stationary member secured to said machine base and a module-receiving member movable relative to said stationary member to and from a workpiece machining position, and means for moving said module-receiving member relative to said stationary member to and from the workpiece machining position, said module-receiving member including means for defining a reference system including mutually perpendicular axes X' and Y' that are substantially parallel, respectively, with the axes X and Y and a plane H' that is spaced from and substantially co-planar with the plane H; a tool module for mounting upon said module-receiving member and including a tool and a means for driving said tool, said tool module having a interface member for cooperatively engaging said module-receiving member to dimensionally define the position of said tool module relative to the axis X' and Y' and the plane H'.

14. The adaptable machining system of claim 13, wherein said transport unit comprises:
a stationary member secured to said machine base and having an elongated guideway;
a module-receiving slide plate mounted upon said elongated guideway for guided movement along an operating axis; and
controllable drive means connected between said module-receiving slide plate and said stationary member for causing controlled movement of said module-receiving member along said guideway.

15. The adaptable machining system of claim 14, wherein said controllable drive means comprises:

means defining a leadscrew connection between said module-receiving slide plate and said stationary member for causing controlled movement of said module-receiving member along said guideway in response to rotation of said leadscrew; and rotary drive means coupled to said leadscrew for causing rotation thereof to cause controlled movement of said module-receiving member along said guideway.

16. The adaptable machining system of claim 14, further comprising:

first and second locating means coupled to said slide plate for defining the X' and Y' axes.

17. The adaptable machining system of claim 16, further comprising:

a plurality of mounting pads connected to said slide plate and defining the plane H'.

18. The adaptable machining system of claim 17, wherein said mounting pads define mounting surfaces spaced from the surface of said slide plate.

19. The adaptable machining system of claim 16, wherein said first and second locating means comprise locating plates connected to said slide plate and having surfaces defining the X' and Y' axes.

20. The adaptable machining system of claim 17, wherein said interface member comprises a tooling plate for mounting upon said slide member and including means for engaging said first and second locating means and said mounting pads to establish the position of said tooling plate relative the X' and Y' axes and the plane H.

21. The adaptable machining system of claim 20, further comprising:

adjustment means between said tooling plate and said first and second locating means for adjusting the dimensional relationship therebetween.

22. The adaptable machining system of claim 20, wherein said adjustment means comprise threaded members.

23. The adaptable machining system of claim 13, further comprising:

an auxiliary tooling unit having at least one workpiece affecting means and detachably connected to said machine base by an umbilical for electrical and non-electrical power.

24. An adaptable machining system comprising:

a machine base having means for defining a dimensional reference system including mutually perpendicular X and Y axes and a plane H at a selected position relative to a Z axis that is normal to said X and Y axes, said machine base including a plurality of workstation positions having a defined position relative to said X and Y axes and said plane H; and a plurality of workstations secured to respective ones of said workstation positions, each workstation including a transport unit having a stationary member secured to said machine base and a module-receiving member movable relative to said stationary member along an operating axis to and from a workpiece machining position, and means for moving said module-receiving member relative to said stationary member along its operating axis to and from the workpiece machining position, at least one transport unit having its operating axis aligned along one of the X and Y axes and the other transport units having their operating axes aligned along the other of the X and Y axes, said module-receiving member of each transport unit including means for defining a reference system including mutually perpendicular axes X' and Y' that are substantially parallel, respectively, with the axes X and Y and a plane H' that is spaced from and substantially coplanar with the plane H; a tool module for mounting upon said module-receiving member and including a tool and a means for driving said tool, said tool module having a interface member for cooperatively engaging said module-receiving member to dimensionally define the position of said tool module relative to the axis X' and Y' and the plane H'.

25. The adaptable machining system of claim 24, wherein at least one of said other transport units is positioned on one side of the operating axis of said one transport unit and at least a second of said other transport units is positioned on the other side of said operating axis of said one transport unit.

26. The adaptable machining system of claim 25, further comprising:

a tooling gantry connected to interface members mounted upon the module-receiving members of said at least one and said at least second transport units.

27. The adaptable machining system of claim 24, wherein said transport unit comprises:

a stationary member secured to said machine base and having an elongated guideway;

a module-receiving slide plate mounted upon said elongated guideway for guided movement along its operating axis; and controllable drive means connected between said module-receiving slide plate and said stationary member for causing controlled movement of said module-receiving member along said guideway.

28. The adaptable machining system of claim 27, wherein said controllable drive means comprises:

means defining a leadscrew connection between said module-receiving slide plate and said stationary member for causing controlled movement of said module-receiving member along said guideway in response to rotation of said leadscrew; and rotary drive means coupled to said leadscrew for causing rotation thereof to cause controlled movement of said module-receiving member along said guideway.

29. The adaptable machining system of claim 24, further comprising:

first and second locating means coupled to said slide plate for defining the X' and Y' axes.

30. The adaptable machining system of claim 29, further comprising:

a plurality of mounting pads connected to said slide plate and defining the plane H'.

* * * * *